United States Patent [19]
Inose et al.

[11] 3,751,613
[45] Aug. 7, 1973

[54] BREAKABLE COLLISION DETECTING ELEMENT FOR AUTOMOBILES

[75] Inventors: Fumiyuki Inose, Kokubunji;
Masahiro Takahasi, Hachioji;
Takemi Aida, Higashiyamato, all of Japan

[73] Assignee: Hitachi, Ltd., Tokyo, Japan

[22] Filed: Mar. 29, 1972

[21] Appl. No.: 239,189

[52] U.S. Cl. .......... 200/61.08, 200/168 F, 174/68 R
[51] Int. Cl. .............................................. H01h 3/16
[58] Field of Search .................. 200/168 F, 61.08, 200/61.45 R; 174/9 R, 68 R

[56] References Cited
UNITED STATES PATENTS
3,202,754   8/1965   Ruch.................................. 174/68 R
3,230,327   1/1966   McDowell....................... 200/61.08

Primary Examiner—Herman J. Hohauser
Assistant Examiner—Gerald P. Tolin
Attorney—Paul M. Craig, Jr., David T. Terry et al.

[57]          ABSTRACT

A cylindrical glass tube is provided with two metal lead tubes deposited respectively at both ends thereof and has a metal film formed on the inner surface thereof by an electrodeless plating technique; the cylindrical tube is evacuated or charged with an inert gas, to thus provide a breakable collision detecting element.

19 Claims, 2 Drawing Figures

BREAKABLE COLLISION DETECTING ELEMENT FOR AUTOMOBILES

BACKGROUND OF THE INVENTION

Field of the Invention

This invention relates to air-bag systems for protecting vehicle drivers and passengers in the event of collision, and more particularly to a breakable collision detecting element used in a collision detecting system.

One method known for protecting vehicle drivers and passengers is one using air-bags installed in front of the individual seats. These air-bags inflate immediately when collision occurs, to reduce the collision impact upon the driver and passenger. In this air-bag system, collision detecting means are usually installed in the periphery of the vehicle body. One form of a collision detecting means is a breakable collision detecting element which normally remains in the electrically conductive state. The element, when given an external impact greater than a prescribed amount, immediately breaks and loses its conductivity. This element generally comprises: 1 — a base constituted of a fragile material such as glass; 2 — two lead terminals installed distant from each other on the base member; and 3 — a means formed on the base for the purpose of establishing an electrical path between the two terminals. The conduction between the two lead terminals has hitherto been established in such a manner that a relatively strong film such as nichrome film has been deposited by evaporation on a material such as glass, and another film having a high conductivity, such as gold film, has been deposited on the nichrome film. According to this metal film forming method, however, there are difficulties in depositing a metal on the inner surface of the glass tube if the tube diameter is small. Furthermore, deposition method is not so readily suited for mass production.

SUMMARY OF THE INVENTION

An object of the present invention is to provide a collision detecting element manufacturable by simple production process and suited for mass production.

Another object of the invention is to provide a constructionally simple, inexpensive collision detecting element.

With the above and other objects in view, the present invention provides a collision detecting element in which an electrodeless plating technique is utilized to deposit a metal film on the inner surface of a tube constituted of a fragile and airtight material such as glass. Thus, the metal film can be easily and continuously deposited thereon, even if the diameter of the glass tube is so small that it is impossible to form a metal coating on the inner surface by the conventional deposition method which requires placement of a deposition source in the tube. According to another aspect of the invention, a thin tube is used as the glass tube having metal lead tubes deposited at both of its ends. This consideration simplifies the production process. Furthermore, because the lead tube is metal, the glass tube can easily be evacuated or charged with a gas.

DESCRIPTION OF THE PREFERRED EMBODIMENT

The features and advantages of the invention will be better understood from the detailed description taken in conjunction with the accompanying drawings wherein the same numeral references indicate the identical elements.

Figure 1:
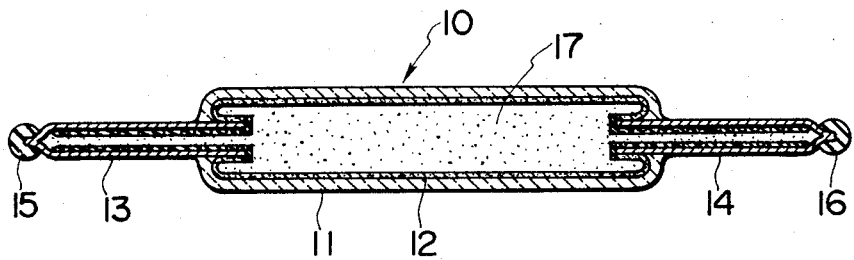
FIG. 1 is a schematic diagram showing the basic constructional features of a collision detecting element of this invention.

Referring to FIG. 1, there is shown the basic construction of a collision detecting element 10 of this invention, wherein the numeral 11 denotes a fragile and airtight cylindrical tube such as a glass tube, 12 a metal film such as silver film having a high conductivity, and 13 and 14 cylindrical metal lead tubes sealed at their outside edges. The inside edges thereof are deposited at both ends of glass tube 11, respectively. Metallic film 12 is formed on the inner surface of glass tube 11 by an electrodeless plating technique after metal lead tube 14 has been connected thereto. The inside edges of the metal lead tubes 13 and 14 are tightly bonded to metal film 12 and, thus, an electrical path is formed between the metal lead tubes, i.e., between the lead terminals 13 and 14. A protective atmosphere or vacuum 17 exists in the cylindrical glass tube 11 for the purpose of protecting the metal film 12 from high temperature heat as well as from moisture. The protective atmosphere 17 may typically be an inert gas.

Generally, this breaking type collision detecting element is fixed in the periphery of the vehicle body. To this effect, the cylindrical glass tube 11 which is the base of the element 10 is bent, conforming to the shape of the periphery of the vehicle body. Previously, it has been difficult to form a metal film on the inner wall of the tube by evaporation deposition. Whereas, according to the invention, a liquid or a gas containing a metal compound is introduced into the glass tube 11 through the metal lead tube 13 or 14, to bring about an electrodeless plating technique therein, whereby a metal film 12 is formed on the inner surface of the tube 11. For this electrodeless plating technique, a silver mirror reaction method is effective, as will be described hereinafter. As described above, the atmosphere 17 inside the glass tube 11 is an inert gas or a vacuum. The purpose of this atmosphere is to minimize the aging variation of the metal film 12 and thus increase the durability and reliability of the element. To obtain a vacuum inside the tube 11, the outside edge 15 of the metal lead tube 13 is sealed and the tube 11 is evacuated through the metal lead tube 14. To charge the tube 11 with a gas, the outside edges of the metal lead tubes 13 and 14 are sealed after enclosing an inactive gas therein. This process is easy and simple. Although the lead terminals may be made of copper or the like, the use of a metal lead tube greatly simplifies the production process.

Figure 2:
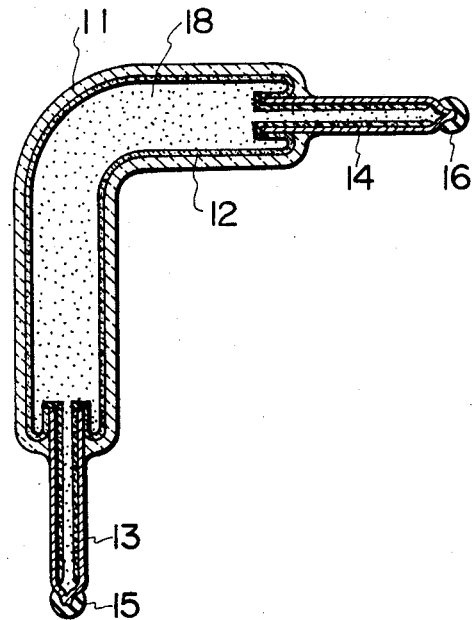
FIG. 2 is a schematic diagram useful for explaining the features of an embodiment of this invention.

FIG. 2 illustrates a collision detecting element embodying this invention. The glass tube 11 is bent, conforming to the curvature of the periphery of the vehicle body and the glass tube is filled with an inactive gas 18. The diameter of the glass tube is about 5mm, and the thickness is about 0.4mm. The diameter and thickness of the glass tube are determined according to the type and weight of the vehicle to which the element is attached. The metal lead tubes 13 and 14 deposited respectively at the both ends of the glass tube 11 are made of nickel or copper with an outer diameter of about 1.5mm and an inner diameter of about 0.8mm. A metal film is formed on the inner surface of the glass tube in the following manner. The inner surface of the glass tube 11 is subjected to a preliminary treatment such as defatting by chrome sulfuric acid. The outside edge 15 of the metal lead tube 13 is releasably plugged to prevent the liquid from escaping. Liquid, the composition of which may be readily empirically determined, is then introduced into the glass tube through the metal lead tube 14. For example, the following example is a liquid using potassium sodium tartrate as the reducing agent.

As a first liquid solution about 20g. of silver nitrate together with a sufficient amount of ammonia water and distilled water to provide about 700 c.c. of liquid is prepared. Then a second liquid solution about 100g. of potassium sodium tartrate, together with about 5 to 10g of silver nitrate with a sufficient amount of distilled water to provide about 700 c.c. of liquid is provided. The first and second liquids are then mixed at an equal ratio. This resulting liquid is supplied into the glass tube 11 and left therein for about two to three hours, to allow formation of a silver film on the inner surface of the glass tube 11. When a silver film has been formed, the liquid is removed and the tube is subjected to post-treatment such as washing and heating. Then the glass tube 11 is charged with an inert gas in the inert gas atmosphere, and the outside edges 15 and 16 of the metal lead tubes 13 and 14 are sealed.

Instead, the tube 11 may be evacuated but the gas sealing process is simpler than the vacuum sealing process because the outside edges of the metal lead tubes can simply be sealed in the atmosphere of an inert gas.

The first liquid solution, above, is prepared as follows:

1. Ammonia is dropped into a solution of $AgNO_3$, so that a brown-black precipitation of $Ag_2O$ is initially produced according to the following equation (1)

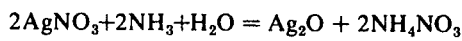

$$2AgNO_3 + 2NH_3 + H_2O = Ag_2O + 2NH_4NO_3$$

(1)

2. Further ammonia is added and a water soluble salt of silver, $Ag(NH_3)_2(OH)$, is obtained from $Ag_2O$ according to the following equation (2)

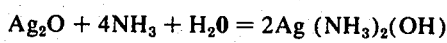

$$Ag_2O + 4NH_3 + H_2O = 2Ag(NH_3)_2(OH)$$

(2)

In electrodeless plating, it is necessary to have a water soluble salt of metal in solution. Metals usable for the present invention are preferrably heavy metals such as, for example, Ag, Au, Cu, Ni, Cd, Co, and Zn. The preferable water-soluble salt of the metal is ammonium salt, phosphate, cyanate or cyanide. It is also preferrable to add a buffer into the solution of the water-soluble salt of the metal.

It is further preferrable to employ a pre-treatment of the inner surface of the interior space of the tube with a solution of 30 percent $SnCl_2$, $2H_2O$ for about 5 minutes or more before electrodeless plating, so that formation of metal film can be attained quicker than by the usual electrodeless plating without the pretreatment.

The foregoing is an example of method of forming a metal film on the inner surface of the glass tube by a silver mirror reaction (as the electrodeless plating technique).

The method of forming a metal film 12 by an electrodeless plating technique has the following advantages:

A. A metal film can easily be deposited on the inner surface even if the diameter of the glass tube is considerably small.

B. Because a liquid is used, a uniform film can be formed on the inner surface thereof regardless of the shape of the glass tube.

C. Because the lead terminals are tubular, the pretreatment can be easily done even if the diameter of the glass tube is small.

D. Because a metal tube is used at the ends of the glass tube, such metal tubes can be used directly as lead wires.

E. The production cost can be minimized.

F. The productivity can be increased.

The method where a silver mirror reaction is employed as the electrodeless plating technique has the following advantages.

G. Because silver is comparatively soft, there are no possibilities of causing cracks in the film due to expansion of glass, resulting in faulty signal delivery.

H. Because the silver film has a high conductivity, the total resistance can be reduced and thus a large signal current (e.g., 0.5A) can be obtained from a low voltage (e.g., 12V). This obviates any necessity of an amplifier.

I. Silver is chemically stable and free of corrosion even though the film is exposed to high temperature heat during production process.

The resistance values of three different samples produced by the foregoing method are listed below.

| Outer Diameter (mm) | Length (mm) | Resistance ($\Omega$) |
|---|---|---|
| 12 | 935 | 6.5 |
| 12 | 420 | 3.5 |
| 12 | 970 | 7.5 |

In the foregoing embodiment a silver film has been used as the conduction film. The invention is not limited to this arrangement; any other suitable metal film may be used in place of the silver film.

Also, according to the invention, a chemical reaction using a gas, vapor or the like may be employed instead of a reaction using liquid.

As has been described above, according to the invention, a constructionally simple, yet high reliable, operably stable collision detecting element can easily be realized by a simple production method. The use of a silver film enhances the stability of the detecting element of the invention. One to two grams of silver nitrate suffices for producing one detecting element. In addition, silver can be collected from the waste liquid, and the cost of the silver film itself is very small to the total element cost. The invention also greatly contributes to a realization of inexpensive collision detecting elements.

While one specific embodiment of the invention and particular modifications thereof have been illustrated and described in detail, it is to be understood that the invention is not limited thereto or thereby.

We claim:

1. A breakable collision detecting element for use in automobile collision detecting systems, comprising:

a. a tubular-shaped member constituted of a fragile material and being sealed with an airtight space therein;

b. two lead terminals provided apart from each other on opposite ends of said tubular-shaped member in such a manner that one end of each said lead terminal extends into the interior of said tubular-shaped member so as to be exposed to the airtight space of said member; and c. a metal film disposed on the inner surface of said tubular-shaped member establishing an electrical path between said two lead terminals; and wherein a protective atmosphere for protecting said metal film is provided in the airtight space of said member for preventing changes in the electrical conductivity of said film.

2. A breakable collision detecting element as defined in claim 1, in which said metal film is a silver film.

3. A breakable collision detecting element as defined in claim 1, in which said protective atmosphere is a vacuum.

4. A breakable collision detecting element as defined in claim 1, in which said protective atmosphere is an inert gas atmosphere.

5. A breakable collision detecting element as defined in claim 1, in which each of said two lead terminals is a metal tubular-spaced lead having an open end extending into said airtight space and an outer hermetically sealed end extending from said tubular-shaped member, whereby the inner surface of the tubular-shaped lead communicates with the airtight space.

6. A breakable collision detecting element as defined in claim 5, in which said protective atmosphere is a vacuum.

7. A breakable collision detecting element as defined in claim 5, in which said protective atmosphere is an inert gas atmosphere.

8. A breakable collision detecting element for use in automobile collision detecting systems comprising:
a tubular-shaped member made of a fragile material and having an airtight space therein;
a pair of tubular-shaped lead terminals having one end open and the other end sealed, said open end extending into said tubular-shaped member so as to be in contact with said airtight space;
a metallic film uniformly disposed on the interior surface of both said tubular-shaped member and said tubular-shaped lead terminals, forming an electrical connection between said member and said between said member and said terminals; and
means provided in said airtight space for protecting said metallic film from change of electrical conductivity, whereby conduction by said tubular-shaped member is terminated when said member is broken.

9. A breakable collision detecting element according to claim 8, wherein the open end of each lead terminal internally extends into each end, respectively, of said tubular-shaped member such that the metallic film is disposed on the outer surface portion of the lead terminals contained within said airtight space.

10. A breakable collision detecting element according to claim 8, wherein said means comprises a vacuum.

11. A breakable collision detecting element according to claim 8, wherein said means comprises an inert gas atmosphere.

12. A breakable collision detecting element according to claim 8, wherein said film is silver.

13. A method of producing a breakable collision detecting element comprising the steps of:

a. welding two lead metal tubes at respectively opposite ends of a basic tube member constituted of a fragile material;

b. filling an interior space of said tube member and of said lead tubes with a fluid solution which contains a water soluble salt of a metal to be plated on an inner surface of said tube member and a reducing agent capable of reducing said salt into the metal;

c. maintaining said tube member in the filled condition with the solution for a certain period of time sufficient to form a film with a certain thickness of the metal on the inner surface of said tube member and of said lead tubes;

d. exhausting said solution from the interior space of said tube member and of said lead tubes;

e. providing a protective atmosphere for protecting said film of the metal from changes in properties thereof in said interior space; and f. sealing the outside edges of said lead tubes to isolate the interior space from the ambient atmosphere.

14. A method according to claim 13, wherein said steps (e) and (f) comprise the steps of:

1. sealing an outside edge of one of said lead tubes;
2. evacuating air from the interior space through the other one of said lead tubes, whereby an evacuated atmosphere is provided in the inner space; and
3. sealing an outside edge of the other one of said lead tubes.

15. A method according to claim 13, wherein said step (e) comprises the step of filling the interior space of said tube member and of the lead tubes with an inert gas.

16. A method according to claim 13, wherein said metal consists of a metal selected from the group consisting of Ag, Au, Cu, Ni, Cd, Co and Zn.

17. A method according to claim 13, wherein said water soluble salt consists of a salt selected from the group consisting of ammonium salt, phosphate, cyanate and cyanide.

18. A method according to claim 13, wherein said metal is silver and said water soluble salt is ammonium salt.

19. A method according to claim 13, further including the step of pre-treating the interior space of said tube member with a solution of $SnCl_2 \cdot 2H_2O$.

* * * * *